（12）United States Patent
Wang

(10) Patent No.: US 11,379,061 B2
(45) Date of Patent: Jul. 5, 2022

(54) DISPLAY MODE SWITCHING METHOD, APPARATUS, DEVICE, AND MEDIUM

(71) Applicants: BEIJING XIAOMI MOBILE SOFTWARE CO., LTD. NANJING BRANCH; BEIJING XIAOMI MOBILE SOFTWARE CO., LTD., Beijing (CN)

(72) Inventor: Di Wang, Beijing (CN)

(73) Assignees: BEIJING XIAOMI MOBILE SOFTWARE CO., LTD. NANJING BRANCH, Beijing (CN); BEIJING XIAOMI MOBILE SOFTWARE CO., LTD., Beijing (CN)

( * ) Notice: Subject to any disclaimer, the term of this patent is extended or adjusted under 35 U.S.C. 154(b) by 123 days.

(21) Appl. No.: 16/764,875

(22) PCT Filed: Aug. 9, 2019

(86) PCT No.: PCT/CN2019/100078
§ 371 (c)(1),
(2) Date: May 17, 2020

(87) PCT Pub. No.: WO2021/026697
PCT Pub. Date: Feb. 18, 2021

(65) Prior Publication Data
US 2022/0004271 A1 Jan. 6, 2022

(51) Int. Cl.
G06F 3/041 (2006.01)
G06F 3/03 (2006.01)
(Continued)

(52) U.S. Cl.
CPC .............. G06F 3/041 (2013.01); G06F 3/03 (2013.01); G09G 3/2092 (2013.01); G09G 5/14 (2013.01);
(Continued)

(58) Field of Classification Search
CPC .. G06F 3/041; G06F 3/03; G06F 2203/04105; G06F 2203/04106;
(Continued)

(56) References Cited

U.S. PATENT DOCUMENTS 10,594,857 B2 * 3/2020 Zhang ................... G06F 3/1423
10,782,926 B2 * 9/2020 Zheng ............... H04M 1/72454
(Continued)

Primary Examiner — Vijay Shankar
(74) Attorney, Agent, or Firm — Syncoda LLC; Feng Ma

(57) ABSTRACT

A method for switching a display mode is applied to a terminal, wherein a display screen covers a front surface and a back surface of the body of the terminal including a first display region on the front surface of the body and a second display region on the back surface; the method includes: displaying in a first display mode in which the first display region is in a screen-on state and the second display region is in a screen-off state; acquiring touch information of the display screen and a flip angle of the terminal; and switching the display mode from the first display mode to a second display mode in which the first display region is in the screen-off state and the second display region is in the screen-on state when the touch information satisfies a first condition and the flip angle of the terminal satisfies a second condition.

20 Claims, 9 Drawing Sheets

(51) Int. Cl.
*G09G 3/20* (2006.01)
*G09G 5/14* (2006.01)

(52) U.S. Cl.
CPC .............. *G06F 2203/04105* (2013.01); *G06F 2203/04106* (2013.01)

(58) Field of Classification Search
CPC ...... G02F 1/1323; G09G 3/2092; G09G 5/14; G09G 2300/0447; G09G 2320/028
See application file for complete search history.

(56) References Cited

U.S. PATENT DOCUMENTS

| | | | |
|---|---|---|---|
| 10,866,694 B2* | 12/2020 | Kim | G06F 3/0488 |
| 11,007,426 B2* | 5/2021 | Tian | A63F 13/92 |
| 2020/0272398 A1* | 8/2020 | Zheng | G06F 3/1423 |
| 2021/0173533 A1* | 6/2021 | Kim | G06F 3/04817 |

* cited by examiner

DISPLAY MODE SWITCHING METHOD, APPARATUS, DEVICE, AND MEDIUM

CROSS-REFERENCE TO RELATED APPLICATION

The present application is a national stage of International Application No. PCT/CN2019/100078 filed on Aug. 9, 2019, the disclosure of which is hereby incorporated by reference in its entirety.

TECHNICAL FIELD

The present application relates to the field of electronic devices, and in particular, to a method, an apparatus, a device, and a medium for switching a display mode of a display screen.

BACKGROUND

An increase in a usable area of a display screen of a terminal can provide a better user experience. Taking a smart phone as an example, the use area of the display screen of the smart phone can be increased by adopting a dual display screen, a foldable display screen, a curved display screen, and the like.

In a situation where the display screen of the smart phone completely covers a front surface and a back surface of the body of the smart phone, the front surface of the body of the smart phone is a main display region (i.e., a front display region) of the smart phone, the back surface of the body is a secondary display region (i.e., a back display region) of the smart phone, and information interaction can be performed between the main display region and the secondary display region. In the related art, there is provided on the smart phone a trigger control or a physical switch supporting the switching between a display function of the front display region and a display function of the back display region, and the user realizes the switching between the display function of the front display region and the display function of the back display region by using the trigger control or the physical switch; alternatively, the switching between the display function of the front display region and the display function of the back display region is performed through a touch signal of the user, which is received on the smart phone.

Based on the above situation, before triggering the control or the physical switch, the user needs to determine a display direction of the display screen of the smart phone first, and then trigger the control or the physical switch. When the user switches the display function of the front display region and the display function of the back display region by using the touch signal, the switching between display functions of the display regions may be misjudged due to the similar touch signals received by the smart phone which are caused by the similar gestures of the user holding the smart phone.

SUMMARY

Embodiments of the present disclosure provide a method, an apparatus, a device, and a storage medium for switching a display mode, which can solve the problem in the related art that, in the case of the front surface and the back surface of the body of the terminal being covered by a display screen of the terminal, the user needs to determine a display direction in advance when switching a display region of the display screen, or switching of display function of the display region may be misjudged when the touch signals received by the terminal are similar. The technical solution is shown as follows:

According to an aspect of the present application, there is provided a method for switching a display mode, the method is applied to a terminal, a display screen of the terminal covers a front surface of a body and a back surface of the body of the terminal; and the display screen includes a first display region on the front surface of the body and a second display region on the back surface of the body; the method includes:

displaying in a first display mode which is a display mode in which the first display region is in a screen-on state and the second display region is in a screen-off state;

acquiring touch information of the display screen and a flip angle of the terminal; and switching the display mode of the display screen from the first display mode to a second display mode when the touch information satisfies a first condition and the flip angle of the terminal satisfies a second condition, the second display mode being a display mode in which the first display region is in the screen-off state and the second display region is in the screen-on state.

In some embodiments of the present application, the touch information includes touch attribute information of the display screen; said step of switching the display mode of the display screen from the first display mode to a second display mode when the touch information satisfies a first condition and the flip angle of the terminal satisfies a second condition includes: switching the display mode of the display screen from the first display mode to the second display mode when a change level of the touch attribute information reaches a target level and the flip angle of the terminal is greater than a flip angle threshold.

In some embodiments of the present application, the touch attribute information includes position coordinates of a touch point; said step of switching the display mode of the display screen from the first display mode to a second display mode when the touch information satisfies a first condition and the flip angle of the terminal satisfies a second condition includes: switching the display mode of the display screen from the first display mode to the second display mode when a displacement change of the position coordinates of the touch point is greater than a displacement threshold and the flip angle of the terminal is greater than the flip angle threshold.

In some embodiments of the present application, the touch attribute information further includes an area of a touch point; said step of switching the display mode of the display screen from the first display mode to a second display mode when the touch information satisfies a first condition and the flip angle of the terminal satisfies a second condition includes: switching the display mode of the display screen from the first display mode to the second display mode when a change amount of the area of the touch point is greater than an area change threshold and the flip angle of the terminal is greater than the flip angle threshold.

In some embodiments of the present application, the touch attribute information further includes a number of touch points; said step of switching the display mode of the display screen from the first display mode to a second display mode when the touch information satisfies a first condition and the flip angle of the terminal satisfies a second condition includes: switching the display mode of the display screen from the first display mode to the second display mode when the number of the touch points changes and the flip angle of the terminal is greater than the flip angle threshold.

In some embodiments of the present application, the touch attribute information further includes a pressure at a touch point; said step of switching the display mode of the display screen from the first display mode to a second display mode when the touch information satisfies a first condition and the flip angle of the terminal satisfies a second condition includes: switching the display mode of the display screen from the first display mode to the second display mode when a change amount of the pressure at the touch point is greater than a pressure change threshold and the flip angle of the terminal is greater than the flip angle threshold.

In some embodiments of the present application, touch attribute information includes at least two of: position coordinates of a touch point, an area of a touch point, a number of touch points, and a pressure at a touch point; and when change levels of the at least two kinds of touch attribute information respectively reach respective target levels and the flip angle of the terminal is greater than a flip angle threshold, the display mode of the display screen is switched from the first display mode to the second display mode.

According to another aspect of the present application, there is provided an apparatus for switching a display mode, the apparatus is provided with a terminal, a display screen of the terminal covers a front surface of a body and a back surface of the body of the terminal; and the display screen includes a first display region on the front surface of the body and a second display region on the back surface of the body; the apparatus includes:

a display module, configured to display in a first display mode, the first display mode being a display mode in which the first display region is in a screen-on state and the second display region is in a screen-off state;

an acquiring module, configured to acquire touch information of the display screen and a flip angle of the terminal; and a control module, configured to switch the display mode of the display screen from the first display mode to a second display mode when the touch information satisfies a first condition and the flip angle of the terminal satisfies a second condition, the second display mode being a display mode in which the first display region is in the screen-off state and the second display region is in the screen-on state.

In some embodiments of the present application, the touch information includes touch attribute information of the display screen; and the control module is further configured to switch the display mode of the display screen from the first display mode to the second display mode when a change level of the touch attribute information reaches a target level and the flip angle of the terminal is greater than a flip angle threshold.

In some embodiments of the present application, the touch attribute information includes position coordinates of a touch point; and the control module is further configured to switch the display mode of the display screen from the first display mode to the second display mode when a displacement change of the position coordinates of the touch point is greater than a displacement threshold and the flip angle of the terminal is greater than the flip angle threshold.

In some embodiments of the present application, the touch attribute information further includes an area of a touch point; and the control module is further configured to switch the display mode of the display screen from the first display mode to the second display mode when a change amount of the area of the touch point is greater than an area change threshold and the flip angle of the terminal is greater than the flip angle threshold.

In some embodiments of the present application, the touch attribute information further includes a number of touch points; and the control module is further configured to switch the display mode of the display screen from the first display mode to the second display mode when the number of the touch points changes and the flip angle of the terminal is greater than the flip angle threshold.

In some embodiments of the present application, the touch attribute information further includes a pressure at a touch point; and the control module is further configured to switch the display mode of the display screen from the first display mode to the second display mode when a change amount of the pressure at the touch point is greater than a pressure change threshold and the flip angle of the terminal is greater than the flip angle threshold.

In some embodiments of the present application, touch attribute information includes at least two of: position coordinates of a touch point, an area of a touch point, a number of touch points, and a pressure at a touch point; and the control module is further configured to switch the display mode of the display screen from the first display mode to the second display mode when change levels of the at least two kinds of touch attribute information respectively reach respective target levels and the flip angle of the terminal is greater than a flip angle threshold.

According to another aspect of the present application, there is provided a computer device including: a processor and a memory that stores at least one instruction, at least one program, and a code set or an instruction set, and the at least one instruction, the at least one program, and the code set or the instruction set being loaded and executed by the processor to implement the method of switching the display mode according to above aspects.

According to another aspect of the present application, there is provided a computer-readable storage medium, storing at least one instruction, at least one program, and a code set or an instruction set, and the at least one instruction, the at least one program, and the code set or the instruction set being loaded and executed by a processor to implement the method of switching the display mode according to above aspects.

The beneficial effects brought by the technical solutions provided in the embodiments of the present application at least include:

by setting a first condition corresponding to touch information of a display screen and a second condition corresponding to a flip angle of a terminal, it is determined whether the acquired touch information of the display screen and the flip angle of the terminal satisfy the switching condition, and when the touch information satisfies the first condition and the flip angle satisfies the second condition, the display mode of the display screen is automatically switched by the terminal from a first display mode to a second display mode. There is no need for a user to manually switch the display mode of the display screen, and there is no case that the display mode of the display cannot be switched due to the misjudgment of the touch information.

BRIEF DESCRIPTION OF THE DRAWINGS

In order to more clearly illustrate the technical solution in the embodiments of the present disclosure, the drawings used in the description of the embodiments will be briefly described below. It is obvious that the drawings in the following description are merely some embodiments of the present application, and other drawings may also be obtained by those of ordinary skill in the art without making any creative works.

DETAILED DESCRIPTION

Figure 1:
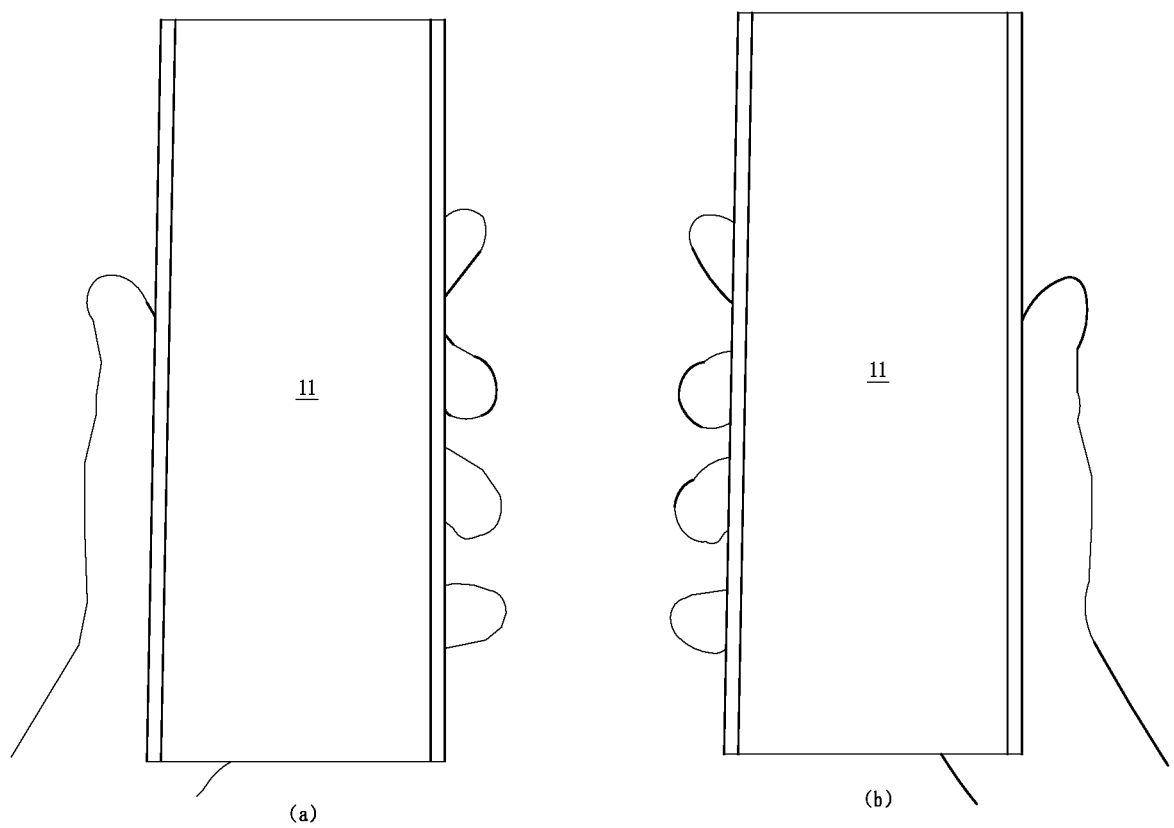
FIG. 1 is a schematic diagram of a display mode of a display screen being switched according to a touch signal provided in an exemplary embodiment of the present application.

In order to make the objects, technical solutions and advantages of the present application more clearly, embodiments of the present application will be further described in detail below with reference to the accompanying drawings.

First, the terms involved in the embodiments of the present application are introduced.

Application processor (AP): it refers to an application processer that exists in the terminal, for example, an application processer in a mobile phone, and an operating system, a user interface, and an application are all executed by the application processor. Taking a mobile phone as an example, a baseband processor (BP) is also provided in the mobile phone, and the baseband processor manages functions related to radio frequency control (such as signal modulation, decoding, and radio frequency shift, etc.), and transmits and receives various data. When there is a problem with the operating system managed by the application chip, the baseband chip will not be affected and can transmit and receive data.

Inter-integrated circuit I2C: it is also known as I2C and IIC, and refers to a bidirectional two-wire synchronous serial communication bus, including bidirectional data lines (Serial Data, SDA) and clock lines (Serial Clock, SCL). I2C may connect the microprocessor to peripheral devices to implement synchronous communication.

Gravity sensor: it refers to a sensor used to detect the change of the direction of the terminal, the deformable crystal is deformed under the action of an external force, and by calculating a relationship between a voltage generated by the deformation of the crystal and an applied acceleration (i.e., external force), the acceleration is converted to a voltage for output. Taking a mobile phone as an example, when a gesture of the mobile phone changes (that is, the mobile phone is flipped by a certain angle), the gravity sensor in the mobile phone detects the corresponding change, and outputs the change in a voltage signal form, such that the mobile phone generates corresponding changes. For example, when a user watches a video on a mobile phone and turns the mobile phone from vertical to horizontal, a corresponding display screen will also be turned from vertical to horizontal for display.

Pressure sensor: it refers to a device or an apparatus that receives a pressure signal and converts the pressure signal into an available output electrical signal according to a certain rule. Taking a mobile phone as an example, a pressure sensor is arranged on the display screen of the mobile phone. When the user touches or clicks on the display screen, the pressure sensor converts the received pressure into a corresponding electrical signal, and the display screen of the mobile phone will display the corresponding content or generate a corresponding change.

An increase in an area of display screen of the terminal provides a better user experience. Taking a smart phone as an example and adopting a form of a mobile phone that covers its front surface of the body and the back surface of the body through a curved display screen, when using this smart phone, the user can choose that it is displayed only on the display screen facing to the user's own side, or that it is displayed on the entire display screen, and information can be exchanged among the display regions on the display screen. Optionally, the user can switch the display region by a control for switching the display region on the display screen or a physical switch, or the display screen can switch the display region according to the change of the touch signal by detecting a touch signal of the user. Schematically, before switching the display region, the user needs to determine whether the current display region is a target display region to be wanted to switch. If it is not the target display region, the user switches the display region by the control for switching the display region or the physical switch.

FIG. 1 is a schematic diagram of a display mode being switched according to a touch signal provided in an exemplary embodiment of the present application, taking that the display region 11 corresponding to the display screen on the front surface of the body is faced to the user as an example.

Schematically, when the display region is switched by detecting a change in a touch signal from the user, if the gestures of holding the smart phone by the users are similar, as shown in (a) of FIG. 1, when the user holds the smart phone with the left hand, the display region 11 corresponding to the display screen on the front surface of the body receives the touch signal of the user's left hand. Taking a gesture in which the thumb of the user's left hand is on a side of the smart phone and the other four fingers are on the other side of the smart phone as an example for illustration. As shown in (b) of FIG. 1, when the smart phone is held by the user's right hand in a same holding manner, the display screen receives a touch signal similar to the touch signal when the smart phone is held by the user's left hand, and at this time, the smart phone may recognize the detected touch signal as being similar to the touch signal held by the user's left hand, such that it is impossible to switch the display region 11.

Figure 2:
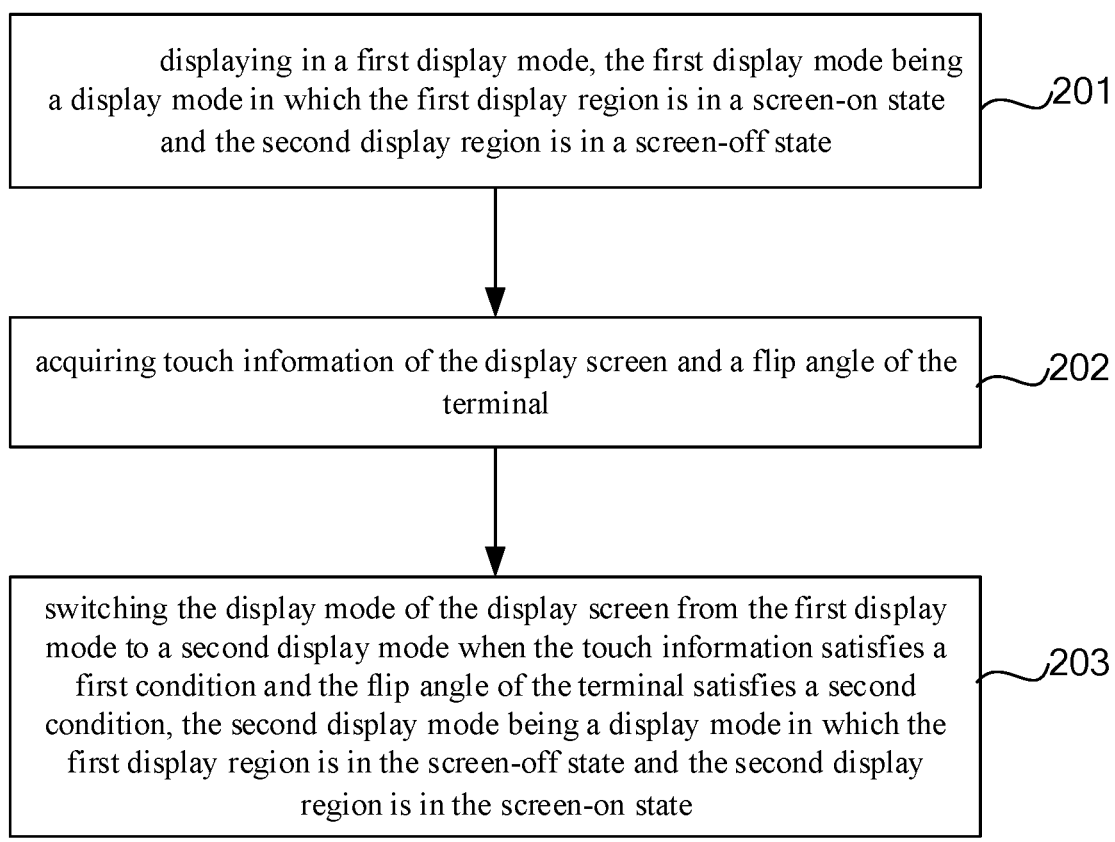
FIG. 2 is a flowchart of a method for switching a display mode provided in an exemplary embodiment of the present application.

There is provided in the present application a method for switching the display mode, and FIG. 2 shows a flowchart of a method for switching the display mode provided in the exemplary embodiment of the present application. The method is applied to a terminal, and a display screen of the terminal covers a front surface of a body and a back surface of the body of the terminal. The display screen includes a first display region on the front surface of the body and a second display region on the back surface of the body. The method includes the following steps.

In step 201, it is displayed in a first display mode, and the first display mode is a display mode in which the first display region is in a screen-on state and the second display region is in a screen-off state.

Optionally, forms of the display screen covering the body of the terminal include, but are not limited to the following forms: the front surface of the body, the back surface of the body, and the edges of the body are all covered by the display screen, and there is no disconnection region in the display screen; or, the body is covered by one display screen, the display screen covers the body from the front surface of the body to the back surface of the body along an edge on one side, and only the edge on one side of the body is covered by the display screen; or, the front surface of the body and the back surface of the body are provided with a display screen respectively, and the edges of the body are not covered by the display screen.

Figure 3:
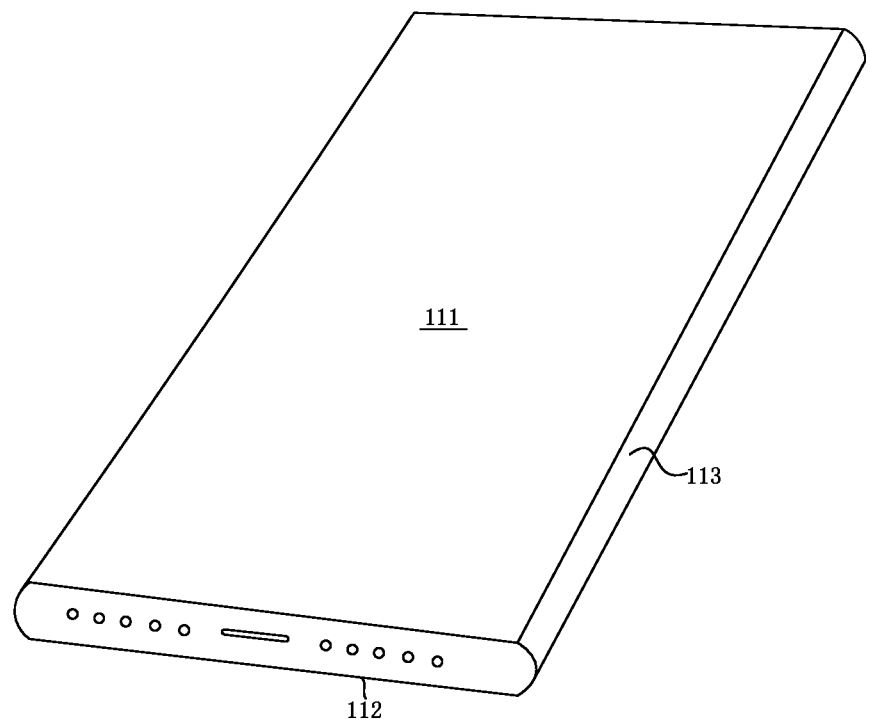
FIG. 3 is a schematic diagram of a structure of a front surface of a body of a terminal provided in an exemplary embodiment of the present application.
Figure 4:
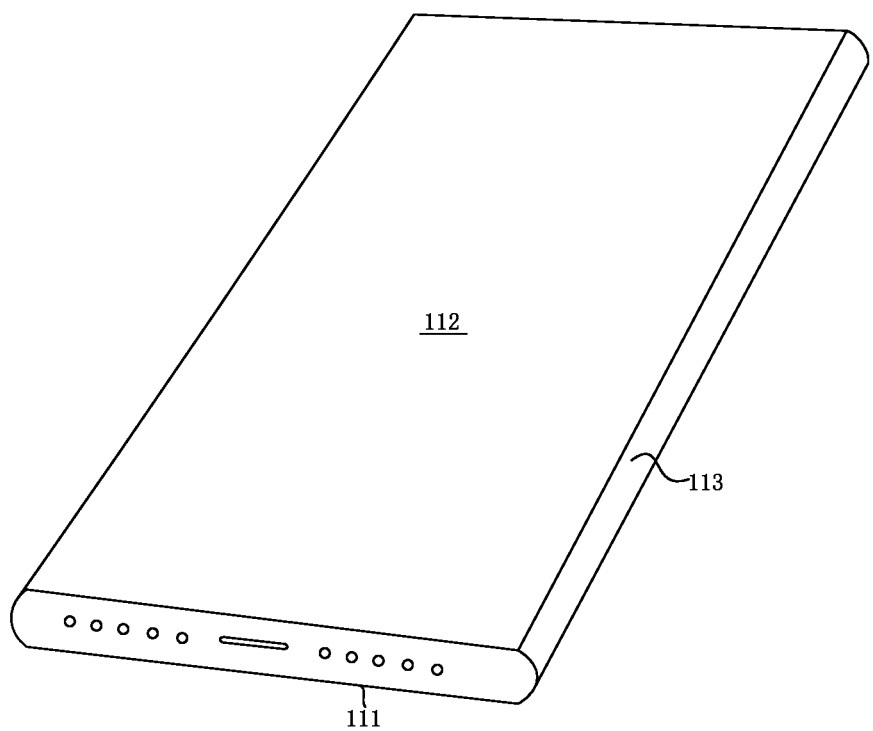
FIG. 4 is a schematic diagram of a structure of a back surface of a body of a terminal provided in an exemplary embodiment of the present application.
Figure 5:
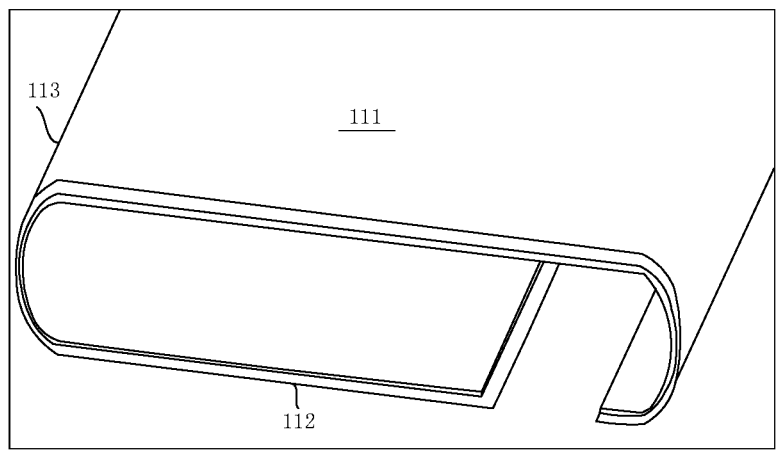
FIG. 5 is a schematic diagram of a structure of a display screen of a terminal provided in an exemplary embodiment of the present application.

FIG. 3 shows a schematic diagram of a structure of a front surface of a body of a terminal provided in an exemplary embodiment of the present application. The front surface of the body and the back surface of the body are both covered by the display screen, and a first display region 111 is located on the front surface of the body; and FIG. 4 shows a schematic diagram of a structure of a back surface of a body of a terminal provided in an exemplary embodiment of the present application, and a second display region 112 is located on the back surface of the body. Optionally, the edge between the front surface of the body and the back surface of the body may be covered with a display screen or without a display screen. The present application takes the edge covered with the display screen as an example for description, and the edges between the front surface of the body and the back surface of the body are a third display region 113 (the right edge of the front surface of the body) and a fourth display region (the left edge of the front surface of the body, not shown) of the display screen, respectively. FIG. 5 is a schematic diagram of a structure of a display screen of a terminal provided in an exemplary embodiment of the present application. The back surface of the body is not completely covered by the display screen, and a part of the back surface of the body is a material corresponding to the body (for example, metal or plastic), that is, an area of the second display region 112 is smaller than an area of the first display region 111.

A screen-on state refers to a state that the display screen of the terminal is displaying; and a screen-off state refers to a state that the display screen of the terminal is not displaying. Optionally, a first display mode is a display mode in which the first display region 111 is in a screen-on state and the second display region 112 is in a screen-off state; alternatively, the first display mode is a display mode in which the first display region 111 is in a screen-off state and the second display region 112 is in a screen-on state. The present application is described by taking a first display mode in which the first display region 111 is in a screen-on state and the second display region 112 is in a screen-off state as an example.

In step 202, touch information of the display screen and a flip angle of the terminal are acquired.

Schematically, taking a user's hand-held smart phone as an example, when the user holds the smart phone, the smart phone acquires the touch state of the user on the display screen. For example, the smart phone is held by the user's right hand, that is, the user's thumb touches the right edge (i.e., the third display region 113) of the smart phone, and the remaining four fingers of the user are on the left side (i.e., the fourth display region) of the smart phone, and the display screen receives the touch information of the user's finger.

Figure 6:
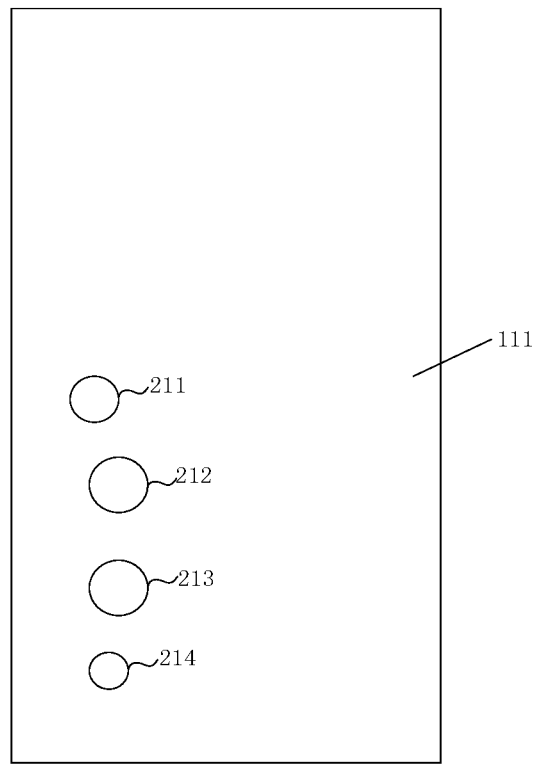
FIG. 6 is a schematic diagram of a display screen receiving a touch signal provided in an exemplary embodiment of the present application.

FIG. 6 is a schematic diagram of a display screen receiving a touch signal provided in an exemplary embodiment of the present application.

Optionally, the touch information may be the touch information on the first display region 111, or the second display region 112, or the third display region 113, or the fourth display region of the display screen. The first display region 111 in which the user touches the display screen is taken as an example. On the first display region 111 of the display screen, the touch information corresponding to the finger of the user is displayed. Schematically, this touch information is a touch signal generated after the user's four fingers touch the first display region 111 of the display screen.

In an example, the touch information 211 is touch information corresponding to the user's index finger, the touch information 212 is touch information corresponding to the user's middle finger, the touch information 213 is touch information corresponding to the user's ring finger, and the touch information 214 is touch information corresponding to the user's little finger. When the user holds the smart phone, the first display region 111 of the display screen receives the touch signal and acquires corresponding touch information. In an example, the touch information is on the third display region 113 and is generated when the user's thumb touches the third display region 113 of the display screen.

It should be noted that the above touch information will not be displayed on the display screen when the user uses the terminal; and shapes corresponding to touch information detected by different display screens are different, and shapes corresponding to the touch information detected by different display regions of single display screen are also different (the shape of the touch information on the display screen may be a rectangle or an irregular pattern). The present application only takes a circle for schematic illustration.

Optionally, a flip angle of the terminal may be acquired by flipping with a long edge of the terminal (i.e., the edges corresponding to the third display region 113 and the fourth display region) as an axis, or with a short edge of the terminal (i.e., the edges corresponding to the upper side and the lower side of the front surface of the body) as an axis. Optionally, the flip angle is obtained by a gravity sensor.

In step 203, the display mode of the display screen is switched from the first display mode to a second display mode when the touch information satisfies a first condition and the flip angle of the terminal satisfies a second condition, and the second display mode is a display mode in which the first display region is in the screen-off state and the second display region is in the screen-on state.

Optionally, the second display mode is a display mode in which the first display region 111 is in a screen-off state and the second display region 112 is in a screen-on state;

alternatively, the second display mode is a display mode in which the first display region 111 is in a screen-on state and the second display region 112 is in a screen-off state. The present application is described by taking a second display mode in which the first display region 111 is in a screen-off state and the second display region 112 is in a screen-on state as an example.

Optionally, the touch information includes touch attribute information of the display screen. Schematically, the touch attribute information is a position of a touch point. Optionally, a first condition is that a change level of the touch attribute information reaches a target level; and a second condition is that a flip angle of the terminal is greater than a flip angle threshold. Schematically, the user holds the smart phone, and when the change level of the touch attribute information acquired by the smart phone reaches the target level, and the flip angle of the terminal is greater than the flip angle threshold, the smart phone is switched from the first display mode to the second display mode, that is, the first display region 111 is in a screen-off state and the second display region 112 is in a screen-on state.

Optionally, the touch attribute information includes position coordinates of the touch point. Schematically, when a displacement change of the position coordinates of the touch point is greater than a displacement threshold, and the flip angle of the terminal is greater than the flip angle threshold, the terminal switches the display mode of the display screen from the first display mode to the second display mode.

Optionally, the displacement threshold is a default setting of the terminal, or the user can customize the setting of the displacement threshold, or the terminal generates intelligently a displacement threshold according to the user's usage habits and the history records. Schematically, the displacement threshold is a unit length based on the size of the display screen of the terminal.

A body angle refers to an angle of the body of the terminal acquired by the gravity sensor at each moment, and the flip angle is measured based on the body angle. The flip angle refers to the difference value between a body angle at the time T and a body angle at the time T−X, and X refers to the period during which the gravity sensor acquires the body angle.

Optionally, the gravity sensor acquires the flip angle of the terminal in two ways:

First, the state of terminal in a most recent time period is taken as a reference. Schematically, the terminal does not generate any flip angle within 5 seconds; or the flip angles of the terminal within 5 seconds are all less than the flip angle threshold, and the gravity sensor acquires an average value of the flip angles within 5 seconds as a state of terminal in a most recent time period; or some of the flip angles of the terminal within 5 seconds are greater than the flip angle threshold and some are less than the flip angle threshold, and the gravity sensor acquires a most recent flip angle of the terminal within 5 seconds. When the flip angle of the terminal changes, the flip angle acquired by the gravity sensor is the flip angle acquired according to the state of the terminal under the reference.

Figure 9:
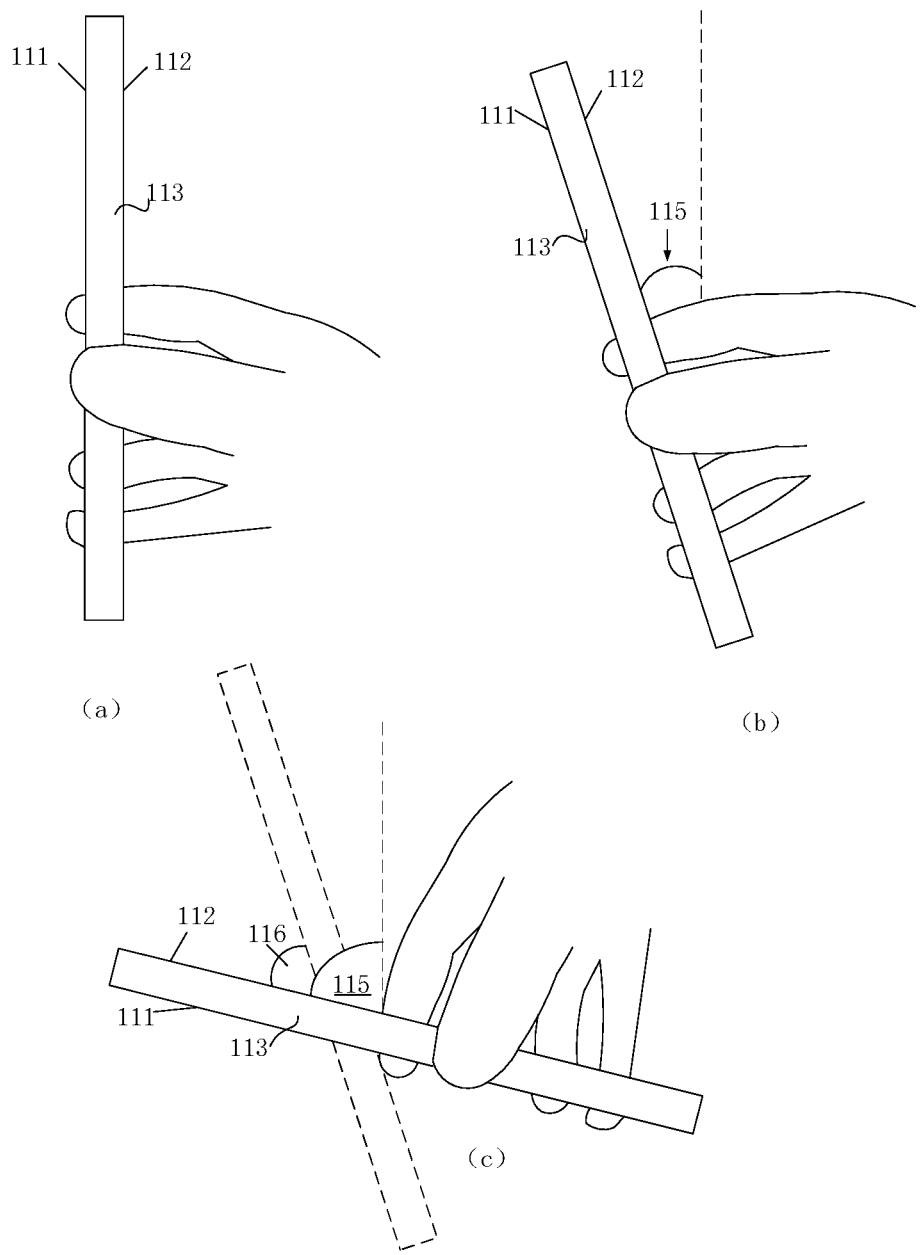
FIG. 9 is a schematic diagram of a user handheld terminal being flipped as provided in an exemplary embodiment of the present application.

The state of terminal in a most recent time period is taken as a reference for illustration. In an example, the user holds a smart phone, and a most recent flip angle of the smart phone acquired by the gravity sensor is 0°. Schematically, the smart phone is perpendicular to a horizontal line, as shown in (a) of FIG. 9; when the smart phone hold by the user is flipped, an body angle 115 is generated (as shown in (b) of FIG. 9) as compared with the reference state of the smart phone (the flip angle is 0°), and the flip angle acquired by the gravity sensor is equal to an angle corresponding to the body angle 115. The smart phone determines whether the flip angle at this time is greater than the flip angle threshold. When the smart phone continues to flip, the smart phone generates a new body angle 115, as shown in (c) of FIG. 9, the flip angle acquired by the gravity sensor is equal to an angle corresponding to the body angle 115, and the smart phone determines whether the flip angle at this time is greater than the flip angle threshold. As compared with the reference state of the smart phone (the flip angle is 0°), the flip angle generated by the smart phone as shown in (c) of FIG. 9 is larger than the flip angle generated by the smart phone as shown in (b) of FIG. 9.

In an example, the smart phone is placed on a plane such as a desk, etc., and the current body angle of the smart phone acquired by gravity sensor is 0°, which is the reference state of the smart phone. When the user picks up the smart phone from the desk, the flip angle generated by the smart phone and acquired by the gravity sensor is equal to an angle corresponding to the body angle 115 relative to the reference state in which the smart phone is placed on the desk (the flip angle is 0°), and the smart phone determines whether this flip angle is greater than the flip angle threshold.

Secondly, the state of the terminal at the time T−X is taken as a reference, the body angle generated in the state at the time T is compared with the body angle of the terminal at the time T−X, and X is the period during which the gravity sensor acquires the body angle.

The state of the terminal at the time T is taken as a reference for illustration. In an example, X represents the period in which the gravity sensor acquires the body angle of the terminal is 1 second, and schematically, the time T is the 3rd second, the gravity sensor acquires the body angle of the smart phone at the 2nd second as a reference, then the smart phone compares the body angle at the 3rd second with the body angle at the 2nd second, and the difference between the body angles at these two moments is the flip angle; schematically, the time T is the 10th second, the gravity sensor acquires the body angle of the smart phone at the 9th second as a reference, then the smart phone compares the body angle at the 10th second with the body angle at the 9th second, and the difference between the body angles at this two moments is the flip angle.

In an example, the state of the smart phone at the time $T_1-X$ is the state that the smart phone is perpendicular to a horizontal line, as shown in (a) of FIG. 9, schematically, the current body angle of the smart phone acquired by gravity sensor is 0°, which is the reference state of the smart phone; when a smart phone hold by the user is flipped, the gravity sensor acquires the body angle 115 of the smart phone at the time $T_1$, as shown in (b) of FIG. 9, the smart phone compares the body angle 115 at the time $T_1$ and the body angle (0°) at the time $T_1-X$, with the body angle 115 at the time $T_1$ is the flip angle of the smart phone (since the body angle at the time $T_1-X$ is 0°, the body angle 115 at the time $T_1$ acquired by the gravity sensor is equal to the flip angle), and the smart phone determines whether this flip angle is greater than the flip angle threshold.

In an example, the state of the smart phone at the time $T_2-X$ is shown in (b) of FIG. 9, schematically, the gravity sensor acquires the body angle 115 of the smart phone at this time, which is the reference state of the smart phone; when a smart phone hold by the user is flipped, the gravity sensor acquires the body angle 115 of the smart phone at the time $T_2$, as shown in (c) of FIG. 9, the smart phone compares the body angle 115 at the time $T_2$ with the body angle 115 at the time $T_2-X$ to acquire the flip angle 116, and the smart phone determines whether the flip angle 116 is greater than the flip angle threshold.

Optionally, the flip angle threshold is a default setting of the terminal, or the user can customize the setting of the flip angle threshold, or the flip angle threshold can be generated intelligently by constructing a neural network model in the terminal according to the user's usage habits and history records.

When training the neural network model, optionally, the terminal is provided with a physical switch that switches the display mode, or an application that controls the terminal to switch the display mode. The user manually switches the display mode of the display screen according to the usage habit or actual situation, and the terminal records the flip angle at each time the user switches the display mode of the display screen, and inputs the flip angle into the neural network model in the terminal for training the neural network model. When the user holds the terminal, the terminal automatically generates a flip angle threshold according to the user's usage habit through the trained neural network model.

The coordinate coordinates corresponding to the touch point when the user touches the display screen can be obtained by establishing a coordinate system on the display screen. Optionally, when the terminal is covered by one display screen, a rectangular coordinate system can be established; when the display screens are respectively arranged on the front surface of the body and the back surface of the body, two rectangular coordinate systems can be respectively established on the two display screens.

Figure 7:
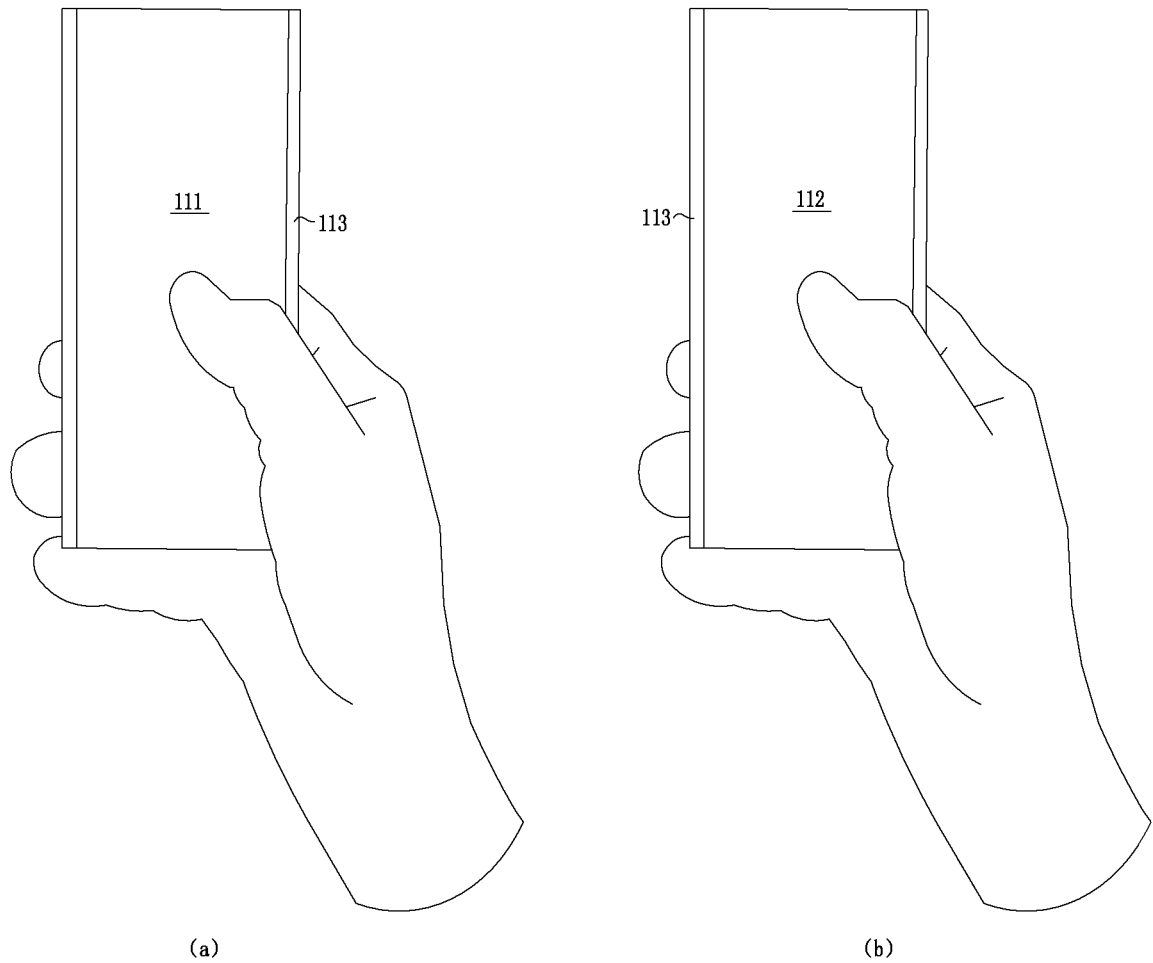
FIG. 7 is a schematic diagram of a displacement of a position coordinate of a touch point provided in an exemplary embodiment of the present application, which is greater than a displacement threshold.

Schematically, the terminal being covered by one display screen is taken as an example for illustration. FIG. 7 shows a schematic diagram of a displacement of a position coordinate of a touch point provided in an exemplary embodiment of the present application, which is greater than a displacement threshold. In (a) of FIG. 7, it is shown that a smart phone is held by a user's right hand, and the first display region 111 of the display screen faces the user, schematically, in this state, taking the user's thumb as the coordinate origin, and the coordinates corresponding to the position of the user's index finger are (x1, y1), the coordinates corresponding to the position of the user's middle finger is (x2, y2), the coordinates corresponding to the position of the user's ring finger is (x3, y3), and the coordinates corresponding to the position of the user's little finger is (x4, y4). As shown in (b) of FIG. 7, schematically, when the user flips the smart phone and the second display region 112 faces the user, the user's thumb touches the second display region 112 of the display screen, and the user's index finger, middle finger and ring finger touch different positions of the first display region 111 respectively, the position coordinates corresponding to the touch point change in the rectangular coordinate system of the single display screen, as shown in (a) of FIG. 7 and (b) of FIG. 7, if a displacement change of the position coordinates corresponding to the touch point exceeds a displacement threshold and the flip angle of the terminal is greater than the flip angle threshold, the smart phone switches the display mode of the display screen from the first display mode to the second display mode.

Schematically, a front surface of the body and a back surface of the body being respectively provided with a display screen is taken as an example for illustration. The display screen of the front surface of the body is a first display screen, and the display screen of the back surface of the body is a second display screen, a first rectangular coordinate system is established on the first display screen, and a second rectangular coordinate system is established on the second display screen. In an example, the user holds a smart phone provided with the first display screen and the second display screen, and the first display screen of the smart phone faces the user, as shown in (a) of FIG. 7, the smart phone acquires position coordinates corresponding to the touch points of the user on the first display screen and the second display screen, that is, position coordinates of the contact point corresponding to the user's thumb are located in the first rectangular coordinate system, and position coordinates of the contact points corresponding to the user's index finger, middle finger, ring finger and little finger are located in the second rectangular coordinate system, when the user flips the smart phone, the second display screen faces the user, the smart phone acquires the position coordinates of the touch points of the user on the first display screen and the second display screen, that is, position coordinates of the contact points corresponding to the user's index finger, middle finger, ring finger and little finger are located in the first rectangular coordinate system and position coordinates of the contact point corresponding to the user's thumb are located in the second rectangular coordinate system. The smart phone determines that the number of touch points in the first rectangular coordinate system changes (changing from a touch point corresponding to the thumb to touch points corresponding to the index finger, middle finger, ring finger, and little finger), and the number of touch points in the second rectangular coordinate system also changes (changing from touch points corresponding to the index finger, middle finger, ring finger and little finger to a touch point corresponding to the thumb), and if the flip angle of the smart phone is greater than the flip angle threshold, the smart phone switches the display screen mode.

In an example, the smart phone is held by the user's right hand, the user's thumb touches the right edge of the front surface of the body, the index finger touches the second display screen, the middle finger, ring finger and little finger touch the left edge of the back surface of the body, and the smart phone acquires the position coordinates (a2, b2) of the touch point corresponding to the index finger in the second rectangular coordinate system. The user changes the way of holding the smart phone, the user's thumb touches the right edge of the back surface of the body, the index finger touches the first display screen, the middle finger, ring finger and little finger touch the left edge of the back surface of the body, and the smart phone acquires the position coordinates (a1, b1) of the touch point corresponding to the index finger in the first rectangular coordinate system, the position coordinates of the touch point corresponding to the index finger acquired by the smart phone are located in the second rectangular coordinate system, and after that, the position coordinates of the touch point corresponding to the index finger acquired by the smart phone are located in the first rectangular coordinate system, and the smart phone thus determines that the coordinate system where the touch point is located has changed, and the position coordinates corresponding to the touch point are displaced.

Optionally, when a displacement change of the position coordinates of the touch point is greater than a displacement threshold and the flip angle of the terminal is greater than the flip angle threshold, the terminal switches the first display mode to the second display mode; alternatively, when a displacement change of the position coordinates of n (n is an integer greater than 1) touch points is greater than a displacement threshold and the flip angle of the terminal is greater than the flip angle threshold, the terminal switches the first display mode to the second display mode.

Optionally, the touch attribute information further includes an area of a touch point. When a change amount of the area of the touch point is greater than an area change threshold and the flip angle of the terminal is greater than the flip angle threshold, the display mode of the display screen is switched by the terminal from the first display mode to the second display mode. Optionally, when the terminal determines that a change amount of the area of the touch point is greater than an area change threshold, it may be that the change amount of the area of each touch point is greater than the area change threshold, or a sum of the change amounts of areas of all touch points is greater than the area change threshold.

Optionally, the area change threshold is a default setting of the terminal, or the user can customize the setting of the area change threshold, or the terminal intelligently generates an area change threshold according to the user's usage habits and history records. Optionally, the neural network model is established in the terminal, and the data, which is about the gesture of holding the terminal when the user uses the terminal and the area change thresholds in the history records of switching the display regions when using the terminal, is acquired and input into the neural network model. When the user holds the terminal, the terminal automatically generates an area change threshold that conforms to the user's usage habit through the trained neural network model.

Referring to FIG. 6, schematically, the area change threshold is 0.1 cm$^2$ and the flip angle threshold is 90°. Four fingers of the user touch the first display region 111, an area of the touch point corresponding to the index finger is 0.9 cm$^2$, an area of the touch point corresponding to the middle finger is 1.2 cm$^2$, an area of the touch point corresponding to the ring finger is 1 cm$^2$, and an area of the touch point corresponding to the little finger is 0.5 cm$^2$. In an example, the manner in which the user holds the smart phone changes, the area of the touch point corresponding to the index finger of the user is 0.5 cm$^2$, the area of the touch point corresponding to the middle finger is 1 cm$^2$, the area of the touch point corresponding to the ring finger is 0.9 cm$^2$, and the area of the touch point corresponding to the little finger is 0.3 cm$^2$, and then a change amount of the area corresponding to each finger is greater than the area change threshold of 0.1 cm$^2$, if the flip angle of the smart phone is greater than 90°, the smart phone switches the display mode of the display screen from the first display mode to the second display mode.

In an example, the smart phone is held by the user's right hand, the user's thumb touches the third display region 113, the user's index finger touches the second display region 112, the user's middle finger, ring finger and little finger touch the fourth display region, the right palm touches the second display region 112, and the smart phone acquires a total area S1 of the touch points on the display screen; the user changes the manner of holding the smart phone, the user's thumb touches the third display region 113, the user's index finger, middle finger and ring finger touch the fourth display region, the right palm is not in contact with any display regions, the smart phone acquires a total area S2 of the touch points on the display screen, and the smart phone determines whether a change amount from the total area S1 to the total area S2 of the contact point is greater than the area change threshold.

Optionally, when a change amount of the area of the touch point is greater than the area change threshold, and the flip angle of the terminal is greater than the flip angle threshold, the terminal switches the display mode of the display screen from the first display mode to the second display mode; alternatively, when a change amount of the area of each of n (n is an integer greater than 1) touch point is greater than the area change threshold, and the flip angle of the terminal is greater than the flip angle threshold, and the terminal switches the display mode of the display screen from the first display mode to the second display mode.

Optionally, the touch attribute information further includes a number of touch points. Schematically, when the number of the touch points changes and the flip angle of the terminal is greater than the flip angle threshold, the terminal switches the display mode of the display screen from the first display mode to the second display mode. Schematically, the flip angle threshold is 85°.

Referring to FIG. 6, schematically, four fingers of the user touch the first display region 111. In an example, the manner in which the user holds the smart phone changes, the user's little finger does not touch the first display region 111, and the user only has three fingers touch the first display region 111, and the number of touch points changes, if the flip angle of the smart phone is greater than a flip angle threshold of 85°, the smart phone switches the display mode of the display screen from the first display mode to the second display mode. The present application is described with a finger as a touch point, and the number of touches on the display screen being reduced means the number of touch points is reduced.

Optionally, the touch attribute information further includes the pressure at the touch point. Optionally, the pressure at the touch point is acquired by a pressure sensor located at a position corresponding to the front surface of the body, or at a position corresponding to the back surface of the body, or at a position corresponding to the edge of the body, or at a position corresponding to the front surface of the body, the back surface of the body and the edge of the body. This application is described with the pressure sensor being located at a position corresponding to the edge of the body.

Schematically, when a change amount of the pressure at the touch point is greater than a pressure change threshold, and the flip angle of the terminal is greater than the flip angle threshold, the terminal switches the display mode of the display screen from the first display mode to the second display mode. Optionally, the pressure change threshold is a default setting of the terminal, or the user can customize the setting of the pressure change threshold, or the terminal intelligently generates a pressure change threshold according to the user's usage habits and history records. Schematically, the pressure change threshold is 0.1 N and the flip angle threshold is 70°. Optionally, a neural network model is established in the terminal, and the data, which is about the pressure of the hand-to-terminal when the user uses the terminal and the pressure change thresholds in the history records of switching the display region when using the terminal, is acquired, and input into the neural network model for training. When the user holds the terminal, the terminal automatically generates a pressure change threshold that conforms to the user's usage habit through the trained neural network model.

Schematically, the user holds the smart phone with the left hand, the thumb of user's left hand is on the left edge of the smart phone (i.e., the left edge of the front surface of the body, that is, the fourth display region), and the remaining four fingers are on the right edge of the smart phone (i.e., the third display region 113). In an example, the display screen on the front surface of the body faces the user, the pressure applied to the display screen and acquired by the pressure sensor is 1 N, when the manner of the user holding the smart phone changes, the pressure applied to the display screen and acquired by the pressure sensor is 1.5 N, the flip angle of the terminal acquired by the gravity sensor is 75°, and then the smart phone switches the display mode of the display screen from the first display mode to the second display mode.

Optionally, when the pressure at the touch point reaches a reading pressure threshold, an application chip (AP) can be triggered to read the current pressure signal. Exemplarily, the read pressure threshold is 0.5 N. In an example, the pressure at the touch point is 0.6 N, and then the pressure at the touch point can trigger the AP to read the current pressure signal. Only the pressure at the touch point reaches the pressure threshold can trigger the AP to read the pressure at the touch point. The AP reads the pressure at the touch point through the integrated circuit bus (I2C), avoiding the pressure sensor being in the working state and consuming the electricity and the power of the terminal.

Optionally, the touch attribute information includes at least two of the following: position coordinates of a touch point, an area of a touch point, the number of touch points, and the pressure at a touch point. When change levels of the at least two kinds of touch attribute information respectively reach respective target levels and the flip angle of the terminal is greater than a flip angle threshold, the terminal switches the display mode of the display screen from the first display mode to the second display mode.

Schematically, when a displacement change of the position coordinates of the touch point is greater than a displacement threshold and the number of the touch points changes, and the flip angle is greater than the flip angle threshold, the terminal switches the display mode of the display screen from the first display mode to the second display mode. Schematically, the displacement threshold is a unit length and the flip angle threshold is 90°.

In an example, the smart phone is held by the user's right hand, and the position coordinates of the touch point corresponding to each finger are: position coordinates of the touch point corresponding to the thumb is (0, 0), position coordinates of the touch point corresponding to the index finger is (−2, −5), position coordinates of the touch point corresponding to the middle finger is (−1, −5), position coordinates of the touch point corresponding to the ring finger is (1, 5), position coordinates of the touch point corresponding to the little finger is (2, 5), and the number of touch points is 4; the user changes the manner of the right hand holding the smart phone, and the position coordinates of the touch point corresponding to each finger are: position coordinates of the touch point corresponding to the thumb is (0, −5), position coordinates of the touch point corresponding to the index finger is (−2, 0), position coordinates of the touch point corresponding to the middle finger is (−1, 0), position coordinates of the touch point corresponding to the ring finger is (1, 0), position coordinates of the touch point corresponding to the little finger is (2, 0), and the number of touch points is 3, the user flips the smart phone by 180°, the displacement change of the position coordinates of the touch point is greater than the displacement threshold and the number of touch points changes, and the flip angle is greater than the flip angle threshold, the smart phone switches the display mode of the display screen from the first display mode to the second display mode.

In summary, by setting a first condition corresponding to touch information of a display screen and a second condition corresponding to a flip angle of a terminal, whether the acquired touch information of the display screen and the flip angle of the terminal satisfy the switching condition is determined, and when the touch information satisfies the first condition and the flip angle satisfies the second condition, the terminal automatically switches the display mode of the display screen from a first display mode to a second display mode, there is no need for a user to manually switch the display mode of the display screen, and there is no case that the display mode of the display cannot be switched due to the misjudgment of the touch information.

Figure 8:
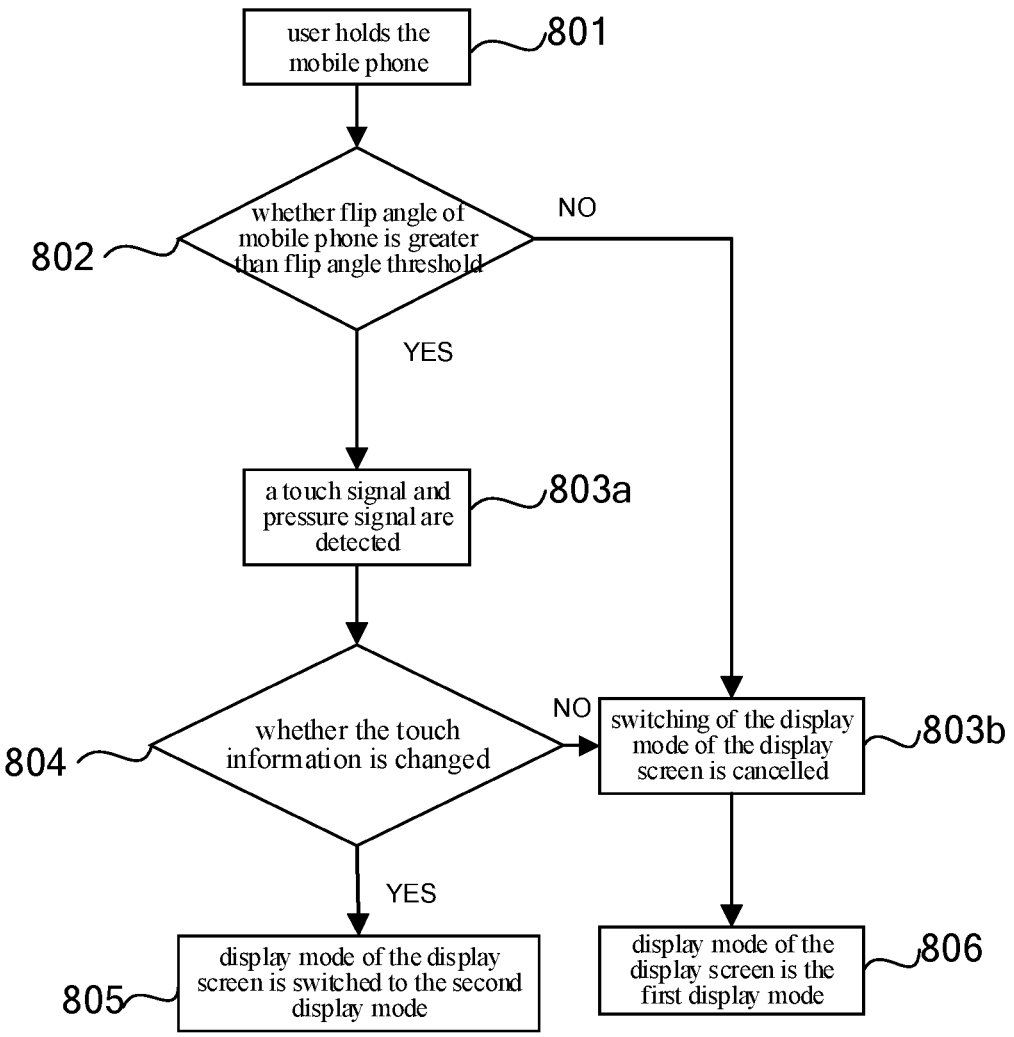
FIG. 8 is a flowchart of a method for switching a display mode provided in another exemplary embodiment of the present application.

FIG. 8 shows a flowchart of a method for switching a display mode provided in another exemplary embodiment of the present application. The method is applied to a terminal, a display screen of the terminal covers a front surface of a body and a back surface of the body of the terminal, and the display screen includes a first display region on the front surface of the body and a second display region on the back surface of the body, the method includes the following steps.

In step 801, the user holds the mobile phone.

The user can hold the smart phone in any manner. FIG. 9 shows a schematic diagram of a user handheld terminal being flipped as provided in an exemplary embodiment of the present application. Schematically, the front surface of the body facing the user is taken as an example. The smart phone is held by the user's right hand, the first display region 111 faces the user, the thumb of user's right hand is located in the third display region 113, and the remaining four fingers are located in the fourth display region (the other edge of the phone), as shown in (a) of FIG. 9.

In step 802, the gravity sensor detects whether the flip angle of the mobile phone is greater than a flip angle threshold.

Schematically, the user changes from a sitting position to a supine position, and the smart phone also flips by a certain angle with the user, compared to (a) of FIG. 9, a body angle 115 is generated (as shown in (b) of FIG. 9), schematically, the body angle 115 is 30°, the flip angle acquired by the gravity sensor is equal to an angle corresponding to the body angle 115 (30°), the flip angle threshold is 15°, and then the smart phone determines that the flip angle is greater than the flip angle threshold, and proceeds to step 803a; schematically, the flip angle is 80°, the flip angle threshold is 90°, and then the smart phone determines that the flip angle is less than the flip angle threshold, and proceeds to step 803b. Optionally, the flip angle threshold is a default setting of the terminal, or the user can customize the setting of the flip angle threshold, or a flip angle threshold is intelligently generated according to the user's usage habits and the history records by constructing a neural network model in the terminal.

Optionally, the user sets the flip angle threshold by using setting options of the terminal. Optionally, the user can adjust the flip angle threshold by dragging the slider, or directly input the flip angle threshold into the input box. In an example, the flip angle threshold can vary from 0° to 360°.

For example, the user who uses the terminal is a young person (for example, between the ages of 20 and 30), and the set flip angle threshold is in a range of 90° to 180°; the user who uses the terminal is an elderly person (for example, between the ages of 55 and 65), the set flip angle threshold is in a range of 40° to 80°; when the user uses the terminal for racing, such as racing games, the set flip angle threshold is in a range of 85° and 160°; and when the user uses the terminal to read, for example, reading a book, the set flip angle threshold is in a range of 30° to 90°.

In step 803a, a touch signal and a pressure signal are detected.

Schematically, the smart phone detects a touch signal and a pressure signal to acquire touch attribute information. Optionally, the touch attribute information includes: position coordinates of the touch point, an area of the touch point, a number of touch points, and a pressure at the touch point corresponding to the pressure signal.

Schematically, the user changes from a sitting position to a supine position, the flip angle of the smart phone is greater than the flip angle threshold, and the terminal detects the touch signal and the pressure signal of the display screen.

Optionally, the terminal can determine the area of the current touch point according to the acquired touch information, so that the number of touch points (that is, the number of fingers of the user) can be calculated, after the pressure at the touch point is acquired by the pressure sensor, the terminal can further determine whether the number of touch points calculated by the touch area is correct or not according to the pressure at the touch point.

In step 803b, the switching of the display mode of the display screen is cancelled.

The gravity sensor detects that the flip angle of the smart phone is less than the flip angle threshold, and then the switching of display mode of the display screen of the smart phone is cancelled.

Schematically, as shown in FIG. 9, the flip angle of the smart phone is greater than the flip angle threshold, the touch information of the display screen does not change any more, and then the terminal cancels the switching of display mode of the display screen.

In step 804, whether the touch information is changed or not is detected.

After acquiring the touch attribute information, the smart phone detects whether the touch attribute information changes. Optionally, when the change level of at least one of the above touch attribute information reaches the respective target level and the flip angle of the terminal is greater than the flip angle threshold, the process proceeds to step 805; if the attribute change does not occur in the touch attribute information, the process proceeds to step 803b. Schematically, as shown in FIG. 9, after the smart phone generates the flip angle, the touch attribute information does not change, and then the display mode of the display screen of the smart phone is not switched.

In step 805, the display mode of the display screen is switched to the second display mode.

Schematically, after the smart phone generates the flip angle, the number of touch points is reduced, and the smart phone switches the display mode of the display screen from the first display mode to the second display mode.

In step 806, the display mode of the display screen is the first display mode.

Schematically, after the smart phone generates the flip angle, there is no change in any one of the above touch attribute information, and the display mode of the smart phone is not switched, which is still the first display mode (or an initial display mode).

Optionally, when the user holds the terminal, the flip angles of the terminal are different according to the different gestures of the user, for example, a flip angle generated when the user holds the smart phone in a sitting position and a flip angle generated when the user holds the smart phone in a lying position are different.

Taking that the flip angle threshold is 20° and the gravity sensor acquires the state of the terminal in a period of time as a reference for illustration. In an example, the user holds a smart phone and sits in a chair, the first display region 111 faces the user (as shown in (a) of FIG. 9), and the smart phone generates a body angle 115 which is 0°, the flip angle of the smart phone acquired by the gravity sensor is equal to an angle (0°) corresponding to the body angle 115, and this state is taken as the reference state of the smart phone; as shown in (b) of FIG. 9, the user leans on the sofa (not in a lying position) and holds the smart phone, the smart phone generates the body angle 115 (for example, the body angle 115 is 30°), and flip angle of the smart phone acquired by the gravity sensor is equal to an angle (30°) corresponding to the body angle 115, which is greater than the flip angle threshold (20°), comparing to (a) of FIG. 9, the user's holding gesture does not change, that is, the attribute information of the touch point does not change, at this time, the display mode of the smart phone is not switched, the display region facing the user is in a screen-on state, and the display region facing away from the user is in a screen-off state. As shown in (c) of FIG. 9, when the user is lying on the bed, the smart phone generates the body angle 115 (for example, the body angle 115 is 80°), the flip angle acquired by the gravity sensor is equal to an angle (80°) corresponding to the body angle 115, which is greater than the flip angle threshold (20°), comparing to (a) of FIG. 9, the user's holding gesture does not change, that is, the attribute information of the touch point does not change, at this time, the display mode of the smart phone is not switched, the display region facing the user is in a screen-on state, and the display region facing away from the user is in a screen-off state.

In an example, when the user holds the smart phone in the above manners with the arm naturally hanging down, the first display region 111 faces a position of the user's leg, when the user lifts the smart phone to face a position of the user's face, the holding gesture of the user does not change, that is, the attribute information of the touch point does not change; the display mode of the smart phone will not change even if the flip angle generated by the process is greater than the flip angle threshold.

The following is apparatus embodiments of the present application. For details which are not described in detail in the apparatus embodiments, reference may be made to the corresponding description in the foregoing method embodiments, and details are not described herein again.

Figure 10:
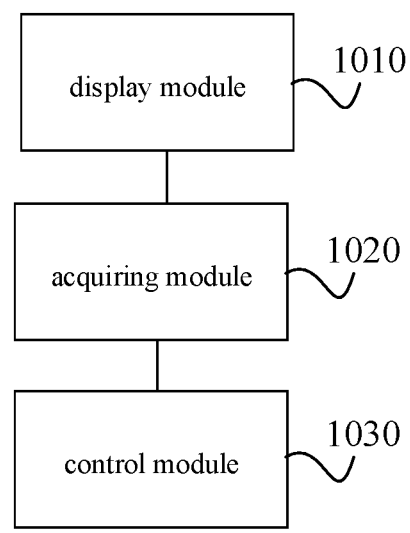
FIG. 10 is a block diagram of an apparatus for switching a display mode provided in an exemplary embodiment of the present application.

FIG. 10 shows a schematic diagram of a structure of an apparatus for switching a display mode provided in an exemplary embodiment of the present application. The apparatus may be implemented as a whole or as a part of the terminal by software, hardware or a combination of the two. The apparatus includes: a display module 1010, an acquiring module 1020 and a control module 1030, wherein the display module 1010 is an optional module.

A display module 1010 is configured to display in a first display mode, and the first display mode is a display mode in which the first display region is in a screen-on state and the second display region is in a screen-off state;

An acquiring module 1020 is configured to acquire touch information of the display screen and a flip angle of the terminal.

A control module 1030 is configured to switch the display mode of the display screen from the first display mode to a second display mode when the touch information satisfies a first condition and the flip angle of the terminal satisfies a second condition, and the second display mode is a display mode in which the first display region is in the screen-off state and the second display region is in the screen-on state.

In an optional embodiment, the touch information includes touch attribute information of the display screen;

and the control module 1030 is further configured to switch the display mode of the display screen from the first display mode to the second display mode when a change level of the touch attribute information reaches a target level and the flip angle of the terminal is greater than a flip angle threshold.

In an optional embodiment, the touch attribute information includes position coordinates of touch points; and the control module 1030 is further configured to switch the display mode of the display screen from the first display mode to the second display mode when a displacement change of the position coordinates of the touch point is greater than a displacement threshold and the flip angle of the terminal is greater than the flip angle threshold.

In an optional embodiment, the touch attribute information further includes an area of a touch point; and the control module 1030 is further configured to switch the display mode of the display screen from the first display mode to the second display mode when a change amount of the area of the touch point is greater than an area change threshold and the flip angle of the terminal is greater than the flip angle threshold.

In an optional embodiment, the touch attribute information further includes a number of touch points; and the control module 1030 is further configured to switch the display mode of the display screen from the first display mode to the second display mode when the number of the touch points changes and the flip angle of the terminal is greater than the flip angle threshold.

In an optional embodiment, the touch attribute information further includes a pressure at a touch point; and the control module 1030 is further configured to switch the display mode of the display screen from the first display mode to the second display mode when a change amount of the pressure at the touch point is greater than a pressure change threshold and the flip angle of the terminal is greater than the flip angle threshold.

In an optional embodiment, touch attribute information includes at least two of: position coordinates of a touch point, an area of a touch point, a number of touch points, and a pressure at a touch point; and the control module 1030 is further configured to switch the display mode of the display screen from the first display mode to the second display mode when change levels of the at least two kinds of touch attribute information respectively reaches respective target levels and the flip angle of the terminal is greater than a flip angle threshold.

Figure 11:
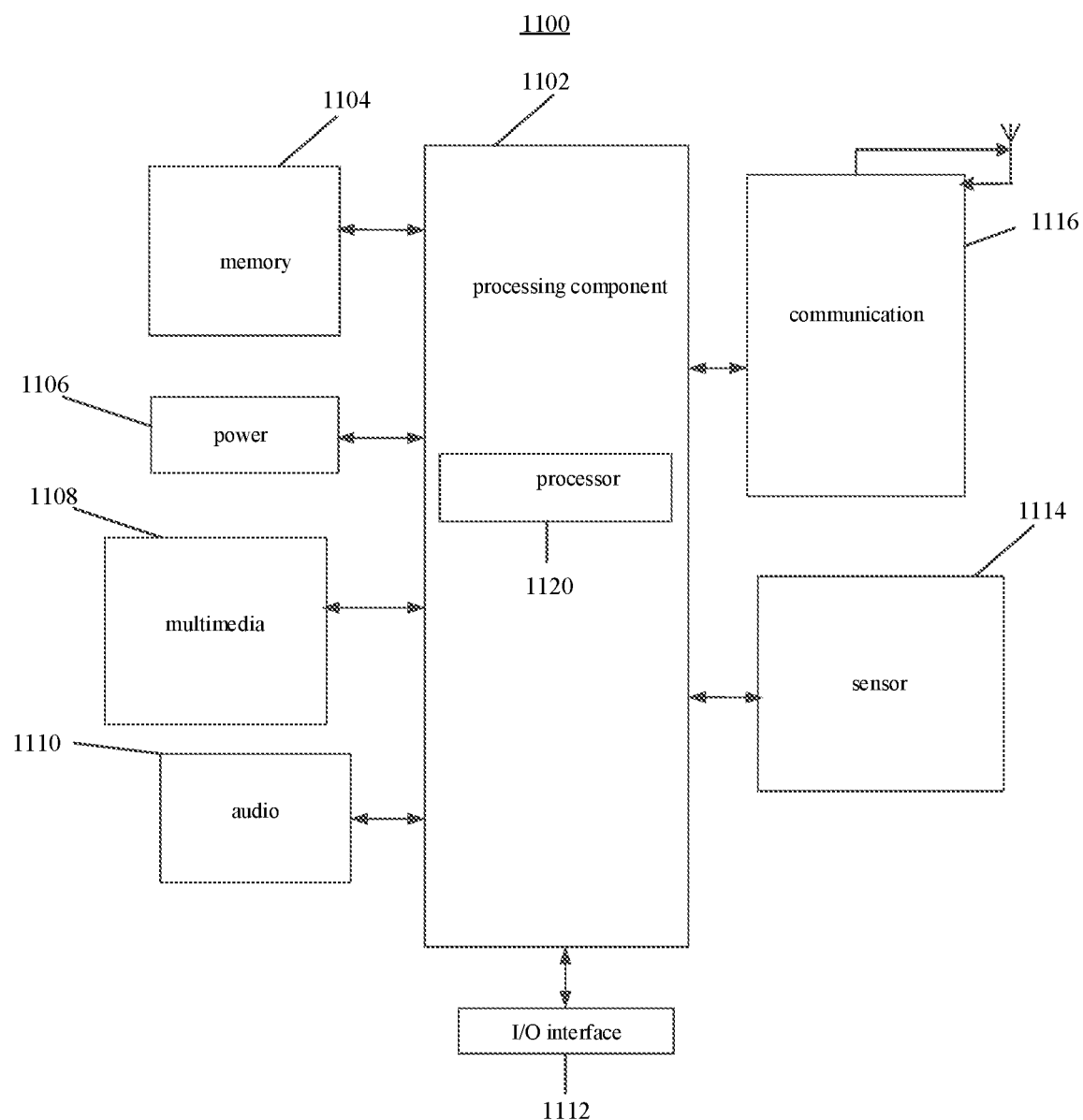
FIG. 11 is a schematic diagram of an apparatus structure of a computer device provided in an exemplary embodiment of the present application.

FIG. 11 is a block diagram of a structure of a computer device 1100 provided in an exemplary embodiment of the present application. The computer device 1100 may be a smart phone or a tablet. The computer device 1100 may also be referred to as a user device, a mobile terminal, a portable terminal, and the like.

A screen of the computer device includes a main display region and a secondary display region, which have different manufacturing attributes, and optical devices are provided under the secondary display region. The computer device 1100 may be an electronic device such as a mobile phone, a tablet, an e-book reader, a multimedia playback device, a wearable device, a laptop portable computer, and the like.

Referring to FIG. 11, the computer device 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls overall operations of the computer device 1100, such as the operations associated with display, telephone calls, data communications, camera operations, and recording operations. The processing component 1102 may include one or more processors 1120 to execute instructions to perform all or part of the steps in the above described methods. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the computer device 1100. Examples of such data include instructions for any applications or methods operated on the computer device 1100, contact data, phonebook data, messages, pictures, video, etc. The memory 1104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the computer device 1100. The power component 1106 may include a power management system, one or more power sources, and any other components associated with the generation, management, and distribution of power in the computer device 1100.

The multimedia component 1108 includes a screen providing an output interface between the computer device 1100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1108 includes a front surface camera and/or a back surface camera. The front surface camera and the back surface camera may receive an external multimedia datum while the computer device 1100 is in an operation mode, such as a photographing mode or a video mode. Each of the front surface camera and the back surface camera may be a fixed optical lens system or have focus and optical zoom capability.

The audio component 1110 is configured to output and/or input audio signals. For example, the audio component 1110 includes a microphone ("MIC") configured to receive an external audio signal when the computer device 1100 is in an operation mode, such as a call mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, buttons, and the like. The buttons may include, but are not limited to, a home button, a volume button, a starting button, and a locking button.

The sensor component 1114 includes one or more sensors to provide state assessments of various aspects of the computer device 1100. For instance, the sensor component 1114 can detect the on/off state of the computer device 1100, and relative positioning of components which are, for example, the display and the keypad of the computer device 1100, and the sensor component 1114 can also detect a change in position of the computer device 1100 or a component of the computer device 1100, a presence or absence of user contact with the computer device 1100, an orientation or an acceleration/deceleration of the computer device 1100, and a change in temperature of the computer device 1100. The sensor component 1114 may include a proximity sensor configured to detect the presence of nearby objects without any physical contact. The sensor component 1114 may also include a light sensor, such as a CMOS or CCD image sensor, for use in imaging applications. In some embodiments, the sensor component 1114 may also include an accelerometer sensor, a gyroscope sensor, a magnetic sensor, a pressure sensor, or a temperature sensor.

The communication component 1116 is configured to facilitate communication, wired or wirelessly, between the computer device 1100 and other devices. The computer device 1100 can access a wireless network based on a communication standard, such as WiFi, 2G, 3G, 4G, 5G, or subsequent evolution systems, or a combination thereof. In one exemplary embodiment, the communication component 1116 receives a broadcast signal or broadcast associated information from an external broadcast management system via a broadcast channel. In one exemplary embodiment, the communication component 1116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the computer device 1100 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, to perform the above described methods for switching a display mode.

In exemplary embodiments, there is also provided a non-transitory computer-readable storage medium having stored thereon computer programs, the computer programs can be executed by the processor 1120 of the device 1100 to implement the above-described method for switching a display mode. For example, the non-transitory computer-readable storage medium may be a ROM, a RAM, a CD-ROM, a magnetic tape, a floppy disc, an optical data storage device, and the like. Those skilled in the art will appreciate that the structure illustrated in FIG. 11 does not constitute a limitation to computer device 1100, which may include more or fewer components than those illustrated, or may be combined with certain components, or may be arranged with different components.

There is provided in the present application a computer device including a processor and a memory, the memory stores at least one instruction, at least one program, and a code set or an instruction set, and the at least one instruction, the at least one program, and the code set or the instruction set are loaded and executed by the processor to implement the method of switching the display mode provided in the method embodiments described above.

There is provided in the present application a computer-readable storage medium, storing thereon at least one instruction, at least one program, and a code set or an instruction set, the at least one instruction, the at least one program, and the code set or the instruction set are loaded and executed by a processor to implement the method of switching the display mode provided in the method embodiments described above.

It should be understood that as referred to herein, "a plurality" means two or more, and "and/or", describing the association relationship among the associated objects, indicates that there may be three relationships, for example, A and/or B, which may indicate that there are three cases where A exists alone, A and B exist at the same time, and B exists alone. The character "/" generally indicates that the associated former and latter objects are in an "or" relationship.

A person skilled in the art may understand that all or part of the steps of implementing the above embodiments may be completed by hardware, or may be completed by programs instructing the related hardware, and the programs may be stored in a computer readable storage medium. The storage medium mentioned above may be a read-only memory, a magnetic disk or an optical disk or the like.

The above descriptions are only optional embodiments of the present application, and are not intended to limit the present application. Any modifications, equivalent replacements, improvements, etc. made within the spirit and principles of the present application are included within the protection scope of the present application.

The invention claimed is:

1. An apparatus for switching a display mode, wherein the apparatus is provided with a terminal, a display screen of the terminal covers a front surface of a body and a back surface of the body of the terminal; and the display screen comprises a first display region on the front surface of the body and a second display region on the back surface of the body; the apparatus comprises:
    a display module, configured to display in a first display mode, the first display mode being a display mode in which the first display region is in a screen-on state and the second display region is in a screen-off state;
    an acquiring module, configured to acquire touch information of the display screen and a flip angle of the terminal; and
    a control module, configured to switch the display mode of the display screen from the first display mode to a second display mode when the touch information satisfies a first condition and the flip angle of the terminal satisfies a second condition, the second display mode being a display mode in which the first display region is in the screen-off state and the second display region is in the screen-on state.

2. The apparatus according to claim 1, wherein the touch information comprises touch attribute information of the display screen; and
    the control module is further configured to switch the display mode of the display screen from the first display mode to the second display mode when a change level of the touch attribute information reaches a target level and the flip angle of the terminal is greater than a flip angle threshold.

3. The apparatus according to claim 2, wherein the touch attribute information comprises position coordinates of a touch point; and
    the control module is further configured to switch the display mode of the display screen from the first display mode to the second display mode when a displacement change of the position coordinates of the touch point is greater than a displacement threshold and the flip angle of the terminal is greater than the flip angle threshold.

4. The apparatus according to claim 2, wherein the touch attribute information further comprises an area of a touch point; and the control module is further configured to switch the display mode of the display screen from the first display mode to the second display mode when a change amount of the area of the touch point is greater than an area change threshold and the flip angle of the terminal is greater than the flip angle threshold.

5. The apparatus according to claim 2, wherein the touch attribute information further comprises a number of touch points; and the control module is further configured to switch the display mode of the display screen from the first display mode to the second display mode when the number of the touch points changes and the flip angle of the terminal is greater than the flip angle threshold.

6. The apparatus according to claim 2, wherein the touch attribute information further comprises a pressure at a touch point; and the control module is further configured to switch the display mode of the display screen from the first display mode to the second display mode when a change amount of the pressure at the touch point is greater than a pressure change threshold and the flip angle of the terminal is greater than the flip angle threshold.

7. The apparatus according to claim 1, wherein the touch attribute information comprises at least two of: position coordinates of a touch point, an area of a touch point, a number of touch points, and a pressure at a touch point; and the control module is further configured to switch the display mode of the display screen from the first display mode to the second display mode when change levels of the at least two kinds of touch attribute information respectively reach respective target levels and the flip angle of the terminal is greater than a flip angle threshold.

8. A method for switching a display mode, wherein the method is applied to a terminal, a display screen of the terminal covers a front surface of a body and a back surface of the body of the terminal; and the display screen comprises a first display region on the front surface of the body and a second display region on the back surface of the body; the method comprises:

displaying in a first display mode which is a display mode in which the first display region is in a screen-on state and the second display region is in a screen-off state;

acquiring touch information of the display screen and a flip angle of the terminal; and switching the display mode of the display screen from the first display mode to a second display mode when the touch information satisfies a first condition and the flip angle of the terminal satisfies a second condition, the second display mode being a display mode in which the first display region is in the screen-off state and the second display region is in the screen-on state.

9. The method according to claim 8, wherein the touch information comprises touch attribute information of the display screen;

said step of switching the display mode of the display screen from the first display mode to a second display mode when the touch information satisfies a first condition and the flip angle of the terminal satisfies a second condition comprises:

switching the display mode of the display screen from the first display mode to the second display mode when a change level of the touch attribute information reaches a target level and the flip angle of the terminal is greater than a flip angle threshold.

10. The method according to claim 9, wherein the touch attribute information comprises position coordinates of a touch point;

said step of switching the display mode of the display screen from the first display mode to a second display mode when the touch information satisfies a first condition and the flip angle of the terminal satisfies a second condition comprises:

switching the display mode of the display screen from the first display mode to the second display mode when a displacement change of the position coordinates of the touch point is greater than a displacement threshold and the flip angle of the terminal is greater than the flip angle threshold.

11. The method according to claim 10, wherein the touch attribute information comprises at least two of: position coordinates of a touch point, an area of a touch point, a number of touch points, and a pressure at a touch point; and when change levels of the at least two kinds of touch attribute information respectively reach respective target levels and the flip angle of the terminal is greater than a flip angle threshold, the display mode of the display screen is switched from the first display mode to the second display mode.

12. The method according to claim 9, wherein the touch attribute information further comprises an area of a touch point;

said step of switching the display mode of the display screen from the first display mode to a second display mode when the touch information satisfies a first condition and the flip angle of the terminal satisfies a second condition comprises:

switching the display mode of the display screen from the first display mode to the second display mode when a change amount of the area of the touch point is greater than an area change threshold and the flip angle of the terminal is greater than the flip angle threshold.

13. The method according to claim 12, wherein the touch attribute information comprises at least two of: position coordinates of a touch point, an area of a touch point, a number of touch points, and a pressure at a touch point; and when change levels of the at least two kinds of touch attribute information respectively reach respective target levels and the flip angle of the terminal is greater than a flip angle threshold, the display mode of the display screen is switched from the first display mode to the second display mode.

14. The method according to claim 9, wherein the touch attribute information further comprises a number of touch points;

said step of switching the display mode of the display screen from the first display mode to a second display mode when the touch information satisfies a first condition and the flip angle of the terminal satisfies a second condition comprises:

switching the display mode of the display screen from the first display mode to the second display mode when the number of the touch points changes and the flip angle of the terminal is greater than the flip angle threshold.

15. The method according to claim 9, wherein the touch attribute information further comprises a pressure at a touch point;
- said step of switching the display mode of the display screen from the first display mode to a second display mode when the touch information satisfies a first condition and the flip angle of the terminal satisfies a second condition comprises:
- switching the display mode of the display screen from the first display mode to the second display mode when a change amount of the pressure at the touch point is greater than a pressure change threshold and the flip angle of the terminal is greater than the flip angle threshold.

16. The method according to claim 9, wherein the touch attribute information comprises at least two of: position coordinates of a touch point, an area of a touch point, a number of touch points, and a pressure at a touch point; and
- when change levels of the at least two kinds of touch attribute information respectively reach respective target levels and the flip angle of the terminal is greater than a flip angle threshold, the display mode of the display screen is switched from the first display mode to the second display mode.

17. The method according to claim 8, wherein touch attribute information comprises at least two of: position coordinates of a touch point, an area of a touch point, a number of touch points, and a pressure at a touch point; and
- when change levels of the at least two kinds of touch attribute information respectively reach respective target levels and the flip angle of the terminal is greater than a flip angle threshold, the display mode of the display screen is switched from the first display mode to the second display mode.

18. A computer device implementing the method of claim 8, wherein the computer device comprises: a processor and a memory, the memory stores at least one instruction, at least one program, and a code set or an instruction set, and the at least one instruction, the at least one program, and the code set or the instruction set are loaded and executed by the processor to implement steps of the method.

19. A non-transitory computer-readable storage medium, wherein the storage medium stores at least one instruction, at least one program, and a code set or an instruction set, and the at least one instruction, the at least one program, and the code set or the instruction set are loaded and executed by a processor to implement the method for switching the display mode according to claim 8.

20. A mobile terminal implementing the method according to claim 8, comprising the display screen, wherein the mobile terminal is configured to:
- set the first condition corresponding to the touch information of the display screen and the second condition corresponding to the flip angle of the mobile terminal;
- determine whether the touch information of the display screen and the flip angle of the terminal satisfy the switching condition;
- upon the touch information satisfying the first condition and the flip angle satisfying the second condition, automatically switching the display mode of the display screen from the first display mode to the second display mode without a user to manually switching the display mode of the display screen, while preventing the display mode of the display screen from being switched due to misjudgment of the touch information.

* * * * *